US008126826B2

(12) United States Patent  
Pollara et al.

(10) Patent No.: US 8,126,826 B2
(45) Date of Patent: Feb. 28, 2012

(54) METHOD AND SYSTEM FOR ACTIVE LEARNING SCREENING PROCESS WITH DYNAMIC INFORMATION MODELING

(75) Inventors: Victor J. Pollara, Dickerson, MD (US); Joseph Lau, Natick, MA (US); Christopher H. Schmid, Natick, MA (US)

(73) Assignee: Noblis, Inc., Falls Church, VA (US)

( * ) Notice: Subject to any disclaimer, the term of this patent is extended or adjusted under 35 U.S.C. 154(b) by 711 days.

(21) Appl. No.: 12/234,219

(22) Filed: Sep. 19, 2008

(65) Prior Publication Data

US 2009/0083200 A1    Mar. 26, 2009

Related U.S. Application Data

(60) Provisional application No. 60/960,248, filed on Sep. 21, 2007.

(51) Int. Cl.
*G06F 15/18* (2006.01)
*G06N 5/02* (2006.01)

(52) U.S. Cl. .......................................... 706/14; 706/61
(58) Field of Classification Search ..................... 706/14
See application file for complete search history.

(56) References Cited

U.S. PATENT DOCUMENTS

| | | | |
|---|---|---|---|
| 4,868,733 A | 9/1989 | Fujisawa et al. |
| 5,386,556 A | 1/1995 | Hedin et al. |
| 5,598,519 A | 1/1997 | Narayanan |
| 5,619,709 A | 4/1997 | Caid et al. |
| 5,632,009 A | 5/1997 | Rao et al. |
| 5,659,724 A | 8/1997 | Borgida et al. |
| 5,675,710 A | 10/1997 | Lewis |
| 5,794,178 A | 8/1998 | Caid et al. |
| 5,880,742 A | 3/1999 | Rao et al. |
| 5,883,635 A | 3/1999 | Rao et al. |
| 5,983,237 A | 11/1999 | Jain et al. |
| 6,085,202 A | 7/2000 | Rao et al. |
| 6,154,213 A | 11/2000 | Rennison et al. |
| 6,363,378 B1 | 3/2002 | Conklin et al. |
| 6,453,312 B1 | 9/2002 | Goiffon et al. |
| 6,453,315 B1 | 9/2002 | Weissman et al. |

(Continued)

FOREIGN PATENT DOCUMENTS

WO    WO 02/10980 A1    2/2002

OTHER PUBLICATIONS

Written Opinion of the International Searching Authority for International Application No. PCT/US2007/082340, issued May 5, 2009 (7 pages).

(Continued)

*Primary Examiner* — Michael B Holmes
(74) *Attorney, Agent, or Firm* — Finnegan, Henderson, Farabow, Garrett & Dunner, L.L.P.

(57) ABSTRACT

Systems and methods consistent with the present invention improve manual screening processes for a group of documents by implementing an active learning screening process with dynamic information modeling. A classification algorithm is trained to recognize the relationships between concept tags applied to a subset of the documents and true or correct utility or relevance ratings applied to the subset of documents. Once adequately trained using several subsets of documents, the classification algorithm may be applied to the entire group of documents, screening out documents that are not relevant or important.

19 Claims, 6 Drawing Sheets

U.S. PATENT DOCUMENTS

| | | |
|---|---|---|
| 6,519,588 B1 | 2/2003 | Leschner |
| 6,560,580 B1 | 5/2003 | Fraser et al. |
| 6,628,312 B1 | 9/2003 | Rao et al. |
| 6,629,081 B1 | 9/2003 | Cornelius et al. |
| 6,629,097 B1 | 9/2003 | Keith |
| 6,665,662 B1 | 12/2003 | Kirkwood et al. |
| 6,675,159 B1 | 1/2004 | Lin et al. |
| 6,694,329 B2 | 2/2004 | Murray |
| 6,766,316 B2 | 7/2004 | Caudill et al. |
| 6,795,825 B2 | 9/2004 | Rishe |
| 6,801,229 B1 | 10/2004 | Tinkler |
| 6,816,857 B1 | 11/2004 | Weissman et al. |
| 6,931,604 B2 | 8/2005 | Lane |
| 6,970,881 B1 | 11/2005 | Mohan et al. |
| 6,976,020 B2 | 12/2005 | Anthony et al. |
| 6,990,480 B1 | 1/2006 | Burt |
| 7,062,705 B1 | 6/2006 | Kirkwood et al. |
| 7,146,349 B2 | 12/2006 | Benitez-Jimenez et al. |
| 7,167,844 B1 | 1/2007 | Leong et al. |
| 7,242,406 B2 | 7/2007 | Robotham et al. |
| 7,251,637 B1 | 7/2007 | Caid et al. |
| 7,890,533 B2 * | 2/2011 | Pollara .......... 707/790 |
| 7,949,629 B2 * | 5/2011 | Pollara .......... 707/602 |
| 2002/0015042 A1 | 2/2002 | Robotham et al. |
| 2002/0049705 A1 | 4/2002 | Haviv-Segal et al. |
| 2002/0069221 A1 | 6/2002 | Rao et al. |
| 2002/0078090 A1 | 6/2002 | Hwang et al. |
| 2002/0103775 A1 | 8/2002 | Quass et al. |
| 2002/0107827 A1 | 8/2002 | Benitez-Jimenez et al. |
| 2002/0198885 A1 | 12/2002 | Streepy, Jr. |
| 2003/0007002 A1 | 1/2003 | Hida et al. |
| 2003/0014442 A1 | 1/2003 | Shiigi et al. |
| 2003/0050915 A1 | 3/2003 | Allemang et al. |
| 2003/0069908 A1 | 4/2003 | Anthony et al. |
| 2003/0083767 A1 | 5/2003 | Karlsberg |
| 2003/0123737 A1 | 7/2003 | Mojsilovic et al. |
| 2003/0131338 A1 | 7/2003 | Georgalas |
| 2003/0163366 A1 | 8/2003 | Taft |
| 2003/0182281 A1 | 9/2003 | Wittkowski |
| 2003/0217335 A1 | 11/2003 | Chung et al. |
| 2004/0049522 A1 | 3/2004 | Streepy, Jr. |
| 2004/0088308 A1 | 5/2004 | Bailey et al. |
| 2004/0111408 A1 | 6/2004 | Caudill et al. |
| 2005/0055365 A1 | 3/2005 | Ramakrishnan et al. |
| 2005/0075832 A1 | 4/2005 | Ikeguchi et al. |
| 2005/0132284 A1 | 6/2005 | Lloyd et al. |
| 2005/0138556 A1 | 6/2005 | Brun et al. |
| 2005/0140694 A1 | 6/2005 | Subramanian et al. |
| 2005/0154701 A1 | 7/2005 | Parunak et al. |
| 2005/0165724 A1 | 7/2005 | West |
| 2005/0171760 A1 | 8/2005 | Tinkler |
| 2005/0182764 A1 | 8/2005 | Evans |
| 2005/0192824 A1 | 9/2005 | Schuetze et al. |
| 2005/0192926 A1 | 9/2005 | Liu et al. |
| 2005/0210009 A1 | 9/2005 | Tran |
| 2005/0220351 A1 | 10/2005 | Vanderwende et al. |
| 2005/0256892 A1 | 11/2005 | Harken |
| 2005/0262053 A1 | 11/2005 | Liou et al. |
| 2005/0278321 A1 | 12/2005 | Vailaya et al. |
| 2005/0289102 A1 | 12/2005 | Das et al. |
| 2006/0047649 A1 | 3/2006 | Liang |
| 2006/0123000 A1 | 6/2006 | Baxter et al. |
| 2006/0136589 A1 | 6/2006 | Konig et al. |
| 2006/0136805 A1 | 6/2006 | Conn et al. |
| 2006/0179051 A1 | 8/2006 | Whitney et al. |
| 2006/0184566 A1 | 8/2006 | Lo et al. |
| 2006/0195461 A1 | 8/2006 | Lo et al. |
| 2006/0200763 A1 | 9/2006 | Michaelsen et al. |
| 2007/0073748 A1 | 3/2007 | Barney |
| 2008/0133213 A1 | 6/2008 | Pollara |

OTHER PUBLICATIONS

Brasethvik et al., "Semantically Accessing Documents Using Conceptual Model Descriptions," *Department of Computer and Information Science, IDI, Norwegian University of Technology and Science, NTNU*, Jan. 1, 1999, vol. 1727, pp. 321-333, Berlin, Germany, XP002458535, ISSN: 0302-9743.

Aussenac-Gilles et al., "Ontologies as Background Knowledge to Explore Document Collections," *Institut de Recherche en Informatique de Toulouse*, aussenac/mothe@irit.fr, XP-002458536 (14 pages).

Brasethvik et al., "Semantically Accessing Documents Using Conceptual Model Descriptions," *Department of Computer and Information Science, IDI, Norwegian University of Technology and Science, NTNU* (brase,jag)@idi.ntnu.no, pp. 1-15, XP-002458535.

Brasethvik et al., "Natural Language Analysis for Semantic Document Modeling," *Department of Computer and Information Science, IDI, Norwegian University of Technology and Science, NTNU* (brase,jag)@idi.ntnu.no, pp. 127-140.

Chung et al., "Thematic Mapping—From Unstructured Documents to Taxonomies," *Verity, Inc.*, 2002, pp. 608-610, XP-002458537.

Clemente et al., "Mapping the Course, Marking the Trail," *IT Professional, IEEE Computer Society*, Nov. 1, 2005, pp. 10-15, SP-002420092.

Giger, (Edited by Chiaramella, Yves), "Concept Based Retrieval in Classical IR Systems," *11th International Conference on Research and Development in Information Retrieval*, Grenoble-France, vol. Conf. 11, Jun. 13, 1988, pp. 275-289.

Greenwood et al., "Improving Semi-Supervised Acquisition of Relation Extraction Patterns," *Proceedings of the Workshop on Information Extraction Beyond The Document*, Sydney, Australia, Jul. 2006, pp. 29-35.

Grishman, Information Extraction: Techniques and Challenges, *Lecture Notes in Computer Science 1299*, Spring 1997, pp. 10-27.

Hirschman et al., Overview of BioCreAtIvE: Critical Assessment of Information Extraction for Biology, *BMC Bioinformatics*, 2005, vol. 6, Suppl. 1 (10 pages).

Hobbs, "Generic Information Extraction System," TIPSTER Text Program website, www.itl.nist.gov/iaui/894.02/related_projects/tipster/gen_ie.htm (6 pages).

Marshall et al., Convergence of Knowledge Management and E-Learning: The Getsmart Experience, *IEEE*, 2003, pp. 135-146.

Moskovitch et al., "Vaidurya—A Concept-Based, Context-Sensitive Search Engine For Clinical Guidelines," *MEDINFO*, vol. 11, No. 1, 2004, pp. 140-144, XP-002484225.

Neill, "Meta-Analysis Research Methodology," Web Pages retrieved from en.wikipedia.org and wilderdom.com, Last Updated on May 10, 2006 (11 pages).

Pekar et al., "Categorizing Web Pages as a Preprocessing Step for Information Extraction," Computational Linguistics Group, HLSS, University of Wolverhampton, United Kingdom, 2004 (4 pages).

Robinson et al., "Overview: Information Extraction from Broadcast News," *In Proc. DARPA Broadcast News Workshop*, 1999, pp. 27-30.

Sheth et al., "Managing Semantic Content for the Web," *IEEE Internet Computing*, Jul.-Aug. 2002, pp. 80-87.

"Inxight Thingfinder® Professional SDK," *Inxight Software,Inc.*, Datasheet, 2005, www.inxight.com/pdfs/ThingFinder_Pro.pdf (1 page).

"Inxight ThingFinder and ThingFinder Professional," *Inxight Federal Systems*, Web Pages retrieved from www.inxightfedsys.com, 2008 (2 pages).

"Inxight Enhances Entity Extraction in ThingFinder, Adds Fact Extraction to ThingFinder Professional," *PR Newswire Association LLC*, Mar. 7, 2006, http://www.prnewswire.com/cgi-bin/stories.pl?ACCT=104&STORY=/www/story/03-07-2006/0004314719&EDATE. (3 pages).

"Inxight and Visual Analytics Partner to Tag and Visualize Unstructured Data for Government Operations," *Inxight Software, Inc./Visual Analytics*, Press Release, Aug. 2, 2006, http://www.visualanalytics.com/media/PressRelease/2006-08-02-prnews.html (2 pages).

"Concept Map Tool Handout," *Virginia Tech Department of Entomology*, Nov. 5, 2004 (11 pages).

"Language & Computing Demo," *L&C Global*, Oct. 22, 2007, http://www.landcglobal.com/demo/demo.html (1 page).

NetOwl Extractor (Entity Extraction), *SRA International, Inc.*, Sep. 9, 2008, Web Page retrieved from http://www.sra.com/netowl/extractor (1 page).

"Meta-analysis" from Wikipedia, www.en.wikipedia.org/wiki/meta-analysis (accessed Sep. 5, 2008) (3 pages).

International Search Report for PCT/US2007/011256, mailed Nov. 26, 2007 (4 pages).
International Search Report for PCT/US2007/082340, mailed Jul. 1, 2008 (6 pages).
Notification and International Search Report for PCT/US2008/010935, mailed Nov. 21, 2008 (3 pages).
Notification and Written Opinion of the International Searching Authority for PCT/US2007/011256, mailed Nov. 27, 2008 (8 pages).
Written Opinion of the International Searching Authority for PCT/US2007/082340, mailed Jul. 1, 2008 (8 pages).
Written Opinion of the International Searching Authority for PCT/US2008/10935, mailed Nov. 21, 2008 (6 pages).
Pollara, U.S. Appl. No. 11/434,847, filed May 17, 2006 (45 pages).
Office Action, mailed Dec. 29, 2008, in U.S. Appl. No. 11/976,818, filed Oct. 29, 2007 (22 pages).
Office Action, mailed Jun. 19, 2008, in U.S. Appl. No. 11/434,847, filed May 17, 2006 (50 pages).
Office Action, mailed Jan. 22, 2009, in U.S. Appl. No. 11/434,847, filed May 17, 2006 (32 pages).
Office Action, mailed Jun. 25, 2009, in U.S. Appl. No. 11/434,847, filed May 17, 2006 (34 pages).
Final Office Action, mailed Jan. 21, 2010, in U.S. Appl. No. 11/434,847, filed May 17, 2006 (36 pages).
Final Office Action, mailed Jun. 25, 2009, in U.S. Appl. No. 11/976,818, filed Oct. 29, 2007 (31 pages).
Office Action, mailed Dec. 17, 2009, in U.S. Appl. No. 11/976,818, filed Oct. 29, 2007 (33 pages).
Final Office Action, mailed Jul. 9, 2010, in U.S. Appl. No. 11/976,818, filed Oct. 29, 2007 (33 pages).

* cited by examiner

METHOD AND SYSTEM FOR ACTIVE LEARNING SCREENING PROCESS WITH DYNAMIC INFORMATION MODELING

This application claims the benefit of U.S. Provisional Patent Application No. 60/960,248 filed Sep. 21, 2007, which is herein incorporated by reference. This application is related to U.S. patent application Ser. No. 11/434,847, filed May 17, 2006, and U.S. patent application Ser. No. 11/976,818, filed Oct. 29, 2007, both of which are herein incorporated by reference.

FIELD OF THE INVENTION

The invention relates generally to automated screening processes for documents, and more particularly to an active learning screening process with dynamic information modeling.

BACKGROUND

When a researcher searches for articles or other documents relevant to his research, often he is flooded with a large number of documents obtained from literature searches. To narrow down this set, a reviewer may manually screen the abstracts of hundreds or even thousands of documents in order to identify the small subset of documents that are potentially relevant for further analysis. For example, the systematic review and meta-analyses of the scientific literature related to a medical problem is the foundation of a field known as evidence-based medicine, or EBM. In order to identify a core set of articles (dozens to thousands) for an EBM review, a literature search often begins with thousands of citations, from which the investigators must screen and select the potentially relevant articles. An average EBM evidence report may address one to five key questions and require the manual screening of 5,000 abstracts to find about 100 articles that meet inclusion criteria.

The manual document screening process, however, suffers from several drawbacks. One drawback is that manual screening is often prone to human errors. One source of error stems from a human reviewer's tendency to consider only a fraction of the information in any one document or abstract. The manual document screening process is also often tedious and fatiguing. To reduce the effects of these problems, the screening task is typically done by a team of several people experienced in scientific and methodological issues. The team approach, however, often produces inconsistent results as each team member performs differently. To combat this, and because of varying topics for each project, team training may be employed in an effort to improve the consistency of the results. Duplicate manual screening may also be used to combat errors and inconsistencies. Training and duplicate screening, however, may undesirably increase, or even double, the cost of screening a group of documents.

The manual screening process also suffers from being time consuming, as even an experienced reviewer may spend thirty seconds or more to screen a single abstract. At that rate, screening five thousand abstracts requires about five person days.

The manual screening process is also inflexible. If a review question or criterion is changed midproject, manual re-screening of documents or abstracts introduces additional fatigue, error, and reviewer boredom.

Computers can be used to aid the screening process. However, conventional document review algorithms rely on keywords, and keywords alone are often poor representatives of complex information sought, such as the complex information in medical abstracts and technical documents. More advanced document search algorithms, such as those found in the fields of natural language processing (NLP) and information extraction (IE), improve over keyword searches, but still suffer from deficiencies. A number of special-purpose products are commercially available to extract entities and "facts" from text documents, such as ThingFinder™ by InXight, Extractor™ by NetOwl, and products by the Autonomy™ company, and most of these products can be customized with catalogues of domain-specific entities and with special rules to extract specific information. Among other problems, however, these products are not user-friendly; they must be pre-configured by experts and are thus too inflexible to be applied to the problem of large scale document screening. Moreover, these products do not "learn" and become better at finding relevant documents as they are used.

Moreover, whether keyword, NLP, or IE technology is used to make a first cut and identify an initial set of documents for further consideration, the initial set of documents is typically so large that it is not effective or cost efficient to evaluate each document in the set individually to produce a desired subset of relevant documents.

Accordingly, there exists a need for systems and methods that may transform a process that is now a labor intensive manual process or a limited computer-aided process into an efficient flexible process capable of handling complex information in a large number of documents. There is a need for systems and methods that automatically classify unseen-by-the-user documents accurately and efficiently and that improve their classification of documents as the user learns more about the information provided in the documents.

SUMMARY OF THE INVENTION

Systems and methods consistent with the present invention greatly improve manual screening processes by implementing an active learning screening process with dynamic information modeling. In some embodiments, a classification algorithm is iteratively trained using documents tagged with concepts that model the information in the documents, where the concepts are revised for each iteration by modifying the definitions of existing concepts and/or adding new concepts to and/or removing concepts from the information tagging model. This dynamic modeling of the information in the documents provides different concepts (e.g., variables) and different information to the classification algorithm in each iteration, which trains the classification algorithm until it can satisfactorily categorize a document based on the document's concept tags.

In one aspect, the invention provides systems and computer-assisted methods for screening information in a set of documents, comprising operations and apparatus for creating a set of concepts representing subject matter in the documents; creating a plurality of status labels representing relevancy of the documents to an end use for the set of documents; selecting a first subset of the set of documents; identifying occurrences of concepts from the set of concepts in each document in the first subset based on subject matter in each document; assigning a status label from the plurality of status labels to each document in the first subset based on relevancy of the document to the end use for the document; processing the first subset of the set of documents to learn relationships among the set of concepts and the labels and create a classification model of the relationships; modifying the set of concepts based on the learned relationships among the set of concepts and the status labels; selecting a second subset of the set of documents; assigning a status label from the plurality of status labels to each document in the second subset based on relevancy of the document to the end use for the document; processing the second subset to further learn relationships among the set of concepts and the labels and refine the classification model of the relationships; and if the classification model of the relationships is satisfactory, then screening the set of documents based on the classification model of the relationships, such that a subset of relevant documents is identified.

In another aspect, the invention provides systems and computer-assisted methods for identifying relevant documents among a set of documents, comprising: a) tagging each document in the set of documents with a concept from a set of concepts representing subject matter found in the document; b) selecting a subset of documents from the set of documents; c) assigning a status label to each document in the subset, the status label representing a degree of importance of the document to an end use; d) training a classification algorithm using the subset of documents, where the classification algorithm relates the status labels assigned to the documents to the concepts tagged to the documents; e) applying the classification algorithm to the subset of documents to create a classification label for each document in the subset, the classification label representing a predicted degree of importance of the document to the end use; f) comparing the classification labels to the status labels; g) if the classification labels substantially correspond to the status labels, then applying the classification algorithm to the set of documents to create a classification label for each document; and h) if the classification labels do not substantially correspond to the status labels, then modifying the set of concepts representing subject matter found in the documents and repeating b) through h) using the modified set of concepts.

In yet another aspect the invention provides systems for identifying relevant documents among a set of documents, comprising a memory device containing document data for each document in the set of documents, concept data associated with the document data, status label data associated with the document data and classification label data associated with the document data and a processor, communicatively connected to the memory device, that executes code for performing operations. The operations may comprise a) for the document data for each document in the set of documents, storing in the memory device concept data corresponding to a set of concepts representing subject matter found in the document; b) selecting a subset of documents from the set of documents; c) for the document data for each document in the subset, storing in the memory device status label data for each document in the subset, the status label data representing a degree of importance of the document to an end use; d) executing a classification algorithm that is trained using the subset of documents, where the classification algorithm relates the status label data associated with the document data for each document in the subset to the associated concept data; e) for the document data for each document in the subset, storing in the memory device classification label data for each document in the subset, the classification label data representing a predicted degree of importance of the document to the end use; f) for the document data for each document in the subset, comparing the classification label data to the status label data; g) if the classification label data substantially corresponds to the status label data, then executing the classification algorithm using the set of documents as input to create classification label data associated with the document data for each document in the set of documents; and h) if the classification label data does not substantially corresponds to the status label data, then modifying the set of concepts representing subject matter found in the documents and repeating b) through h) using the modified set of concepts.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain principles of the invention.

DESCRIPTION OF THE EMBODIMENTS

Reference will now be made in detail to exemplary embodiments of the invention, examples of which are illustrated in the accompanying drawings. Wherever convenient, the same reference numbers will be used throughout the drawings to refer to the same or like parts. Although some of the following exemplary embodiments are described in the context of abstracts of documents, the invention is not limited to being used for abstracts only and may be applied to other types of documents, including, for example, entire articles or papers.

Figure 1:
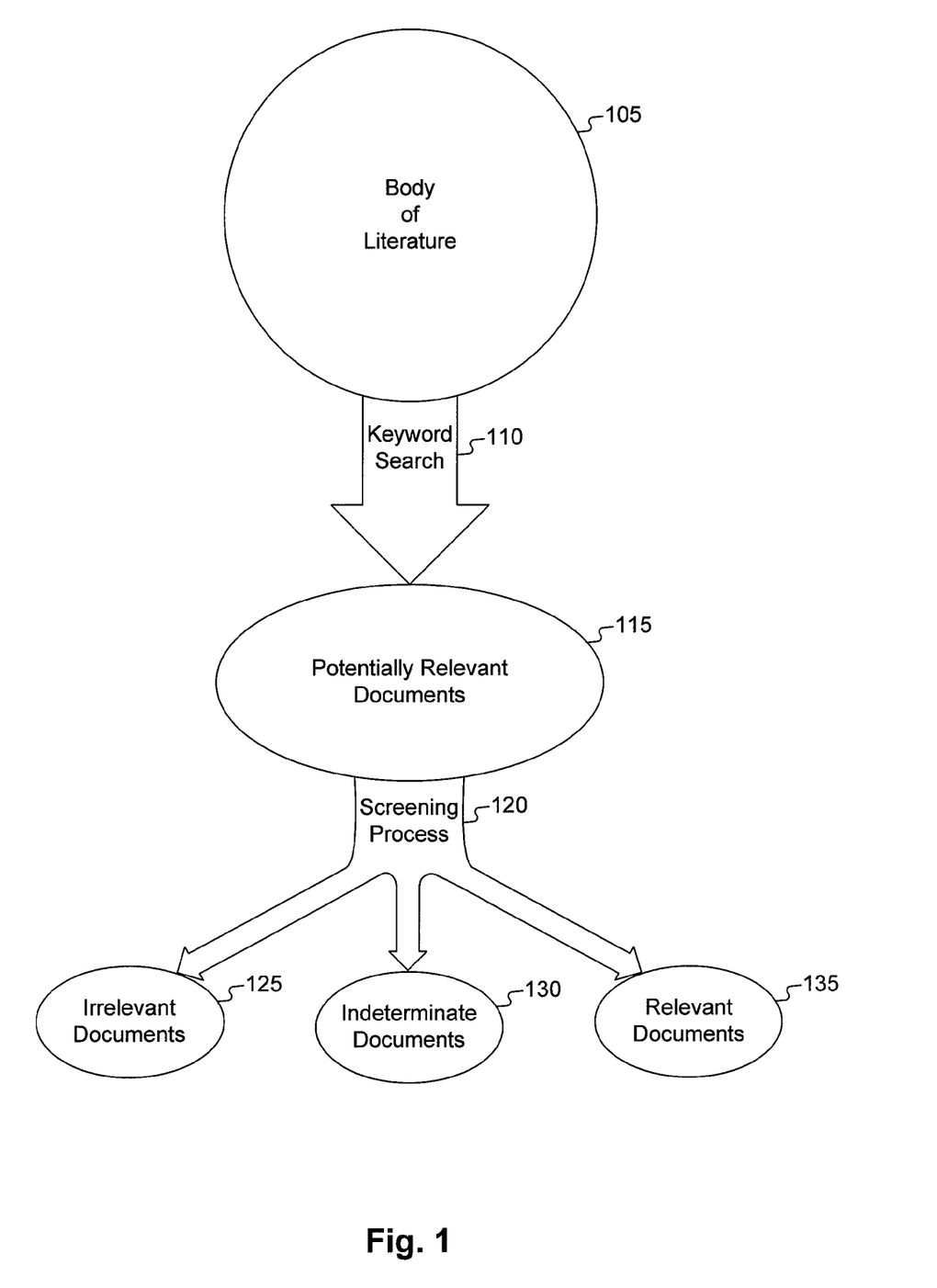
FIG. 1 is a flow diagram of an exemplary high level process for screening documents, consistent with principles of the invention.

FIG. 1 is a flow diagram of an exemplary high level process for screening documents, consistent with principles of the invention. As shown, a large body of literature 105 may exist that relates to a given subject of interest. For example, there are large bodies of literature related to medicine, electrical engineering, software source code, state and federal laws, patents, and myriad other subjects. In one embodiment, large body of literature 105 comprises documents or portions of documents stored in electronic form, such as PDF files, Microsoft Word™ files, ASCII text files, etc.

Researchers, doctors, designers, engineers, and other users typically need documents related to a specific topic within a body of literature 105. To narrow down the body of literature 105 to a more manageable size, a computerized keyword search 110 may be performed on the large body of literature 105, which identifies a group of potentially relevant documents 115. The keywords used in the keyword search 110 may be chosen because they describe the topic that a user is interested in. Because it is very difficult to represent specific, complex topics, such as the complex information in medical and technical literature, with keywords, keyword searching alone typically produces a large group of potentially relevant documents 115, many of which are not relevant to the specific topic of interest.

To reliably and efficiently identify the documents relevant to the specific topic of interest, an automated screening process 120 may be applied to the group of potentially relevant documents 115. Using a trained classification algorithm, the automated screening process 120 may categorize each document in the group of potentially relevant documents 115 into one of three groups: a group of irrelevant documents 125, a group of relevant documents 135, and a group of indeterminate documents 130, which contains documents that the classification algorithm could not confidently categorize into either of the other groups.

A user may utilize the relevant documents 135 for an end purpose, such as solving a problem, conducting a medical or other meta-analysis, designing a product, producing a legal paper, writing software code, etc. The user may also analyze the indeterminate documents 130 to determine whether any of them are relevant to the user's end purpose.

Figure 2:
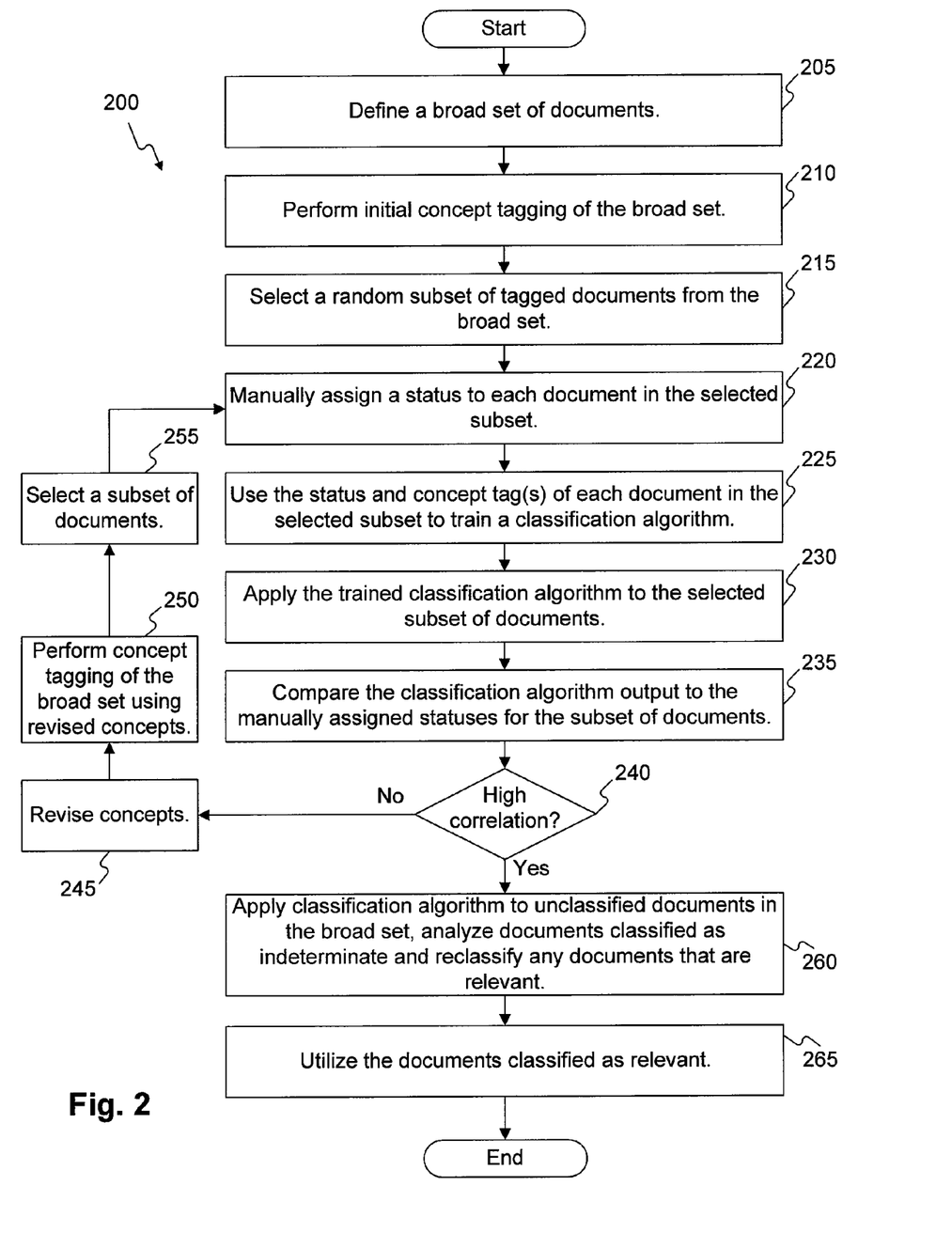
FIG. 2 is a flow diagram of an exemplary process for screening documents, consistent with principles of the invention.

FIG. 2 is a flow diagram of an exemplary process 200 for screening documents, consistent with principles of the invention. In one embodiment, some or all of the stages of process 200 may be performed using a computing system programmed with appropriate software. As shown in the embodiment of FIG. 2, process 200 begins with defining a broad set of documents that may be related to a specific topic(s) specified by a user (stage 205). In one embodiment, the broad set of documents may be identified using a search, such as a keyword search 110, on a large body of literature 105. In some embodiments, such a search may be performed by a search engine or application, as is known in the art.

Next, process 200 performs initial concept tagging of the broad set of documents (stage 210). In one embodiment, concept tagging involves associating each document in the set with zero or more concepts related to or describing a specific topic(s) or subject matter specified by a user that is present in a document, or otherwise identifying each document as containing, or not containing, a given concept(s). For an example related to patent documents, a concept may be "mail sorting machine" and patents that include text strings such as "mail sorting," "package sorting," "sorting machine," and other similar variations may be tagged with the concept "mail sorting machine." In one embodiment, initial concept tagging may be performed by a personal information extraction and modeling (PIEM) tool, as described in U.S. patent application Ser. No. 11/434,847, filed May 17, 2006, and U.S. patent application Ser. No. 11/976,818, filed Oct. 29, 2007, which are incorporated by reference into this application. Other tagging tools may also be used.

At stage 215, a subset of tagged documents, such as a random subset, is selected from the broad set of documents. This initial random subset will be used to train a classification algorithm that will automatically screen out irrelevant documents.

In the embodiment shown, at stage 220, a user manually assigns a status to each document in the selected subset. In one embodiment, the status may be a label representing a binary indicator (e.g., "relevant" and "irrelevant") of the relevance of the document for the purpose desired by the user, such as utilizing the document in the design of a new mail sorting machine. In another embodiment, the status may be a label representing a discrete or continuous scale of importance of the document for the purpose desired by the user, such as a discrete scale from one to ten, where ten indicates highly important to a specific topic(s), and one indicates no importance to the user's purpose. In one embodiment, to assign status, the user reads and evaluates each document, and then classifies each document into one of the possible status categories. Other means of assigning status may also be used, included automated means using computerized expert systems.

Process 200 then proceeds to use the assigned status and the concept tag(s) associated with each document in the selected subset to train a classification algorithm (stage 225). In one embodiment, the classification algorithm relates the status label assigned to a document (which may be thought of as the outcome) to the concept(s) associated with the document (which may be thought of as the variable(s)).

In one embodiment, the classification algorithm may be a type of machine learning application that uses statistical or other optimization criteria to minimize the distance between the status labels and the concepts. Statistical regression, classification trees and neural networks are examples of such classification algorithms that may be used in some embodiments. Other embodiments may use classification algorithms such as support vector machines and k-nearest neighbors, which are known in the text classification art. In some embodiments, the concepts (variables) used may include combinations of concepts, akin to the use of interactions in regression or paths in classification trees. For example, although the presence of two concepts in a document may increase the likelihood of relevance, the increase may not be a simple sum of their weights, but may suggest synergy such that the presence of both concepts is a much stronger predictor than the sum of the effects of either individually. Because of this and other effects, the concepts are usually formed into a classification model that differs from the concept set.

As shown in FIG. 2, process 200 next applies the trained classification algorithm to the subset of documents (stage 230). The output of the trained classification algorithm is a classification label (which may be thought of as a predicted classification) for each document in the broad set of documents. In one embodiment, the classification label includes the same possible values as the possible values of the status assignment used in stage 220. In the simplest example, the algorithm-applied classification label and the user-applied status label may be a binary indicator of relevance, such as "relevant" and "irrelevant." In other embodiments, the user is free to define the number of possible classification values, which may be thought of as categories or bins representing degrees of importance or relevance. In some embodiments, the classification categories may be a discrete or continuous scale of importance, such as a discrete scale from one to ten, where ten indicates highly important to a specific topic(s) or purpose, and one indicates no importance to the specific topic(s), purpose, problem, intended usage, etc. Other types of status labels and classification labels may also be used.

In stage 235, the output of the classification algorithm for each document in the selected subset of documents (e.g., the classification label associated with each document) is compared to the status manually assigned to each of the same documents in stage 220. The classification algorithm may have a goal of minimizing disagreement between the classification label applied by the classification algorithm and the "correct" status label given by the user in stage 220, among other things.

At stage 240, if there is a high correlation between the output of the classification algorithm and the statuses manually assigned to the documents in the selected subset (stage 240, Yes), then the process proceeds to stage 260. A high correlation indicates that the trained classification algorithm categorized a satisfactory percentage of the documents into essentially the same categories as did the user who manually assigned statuses in stage 220. In the embodiment shown, at stage 260 process 200 continues by applying the trained classification algorithm to the previously unclassified documents in the broad set of documents, analyzing documents classified as indeterminate (if any) to determine whether they are relevant, and if so, such documents are reclassified as relevant.

Process 200 then proceeds to stage 265, in which the documents classified as relevant are utilized for an end purpose. In one embodiment, the documents classified as relevant are used in a meta-analysis project. In other embodiments, the documents classified as relevant are used for purposes or problem solving desired by a user, such as design purposes, engineering purposes, legal purposes, business purposes, or other types of end uses.

Returning attention to stage 240, if the comparison of stage 235 indicates that there is not a high correlation between the output of the classification algorithm and the statuses manually assigned to the documents in the selected subset (stage 240, No), then the process proceeds to stage 245. In one embodiment, a low correlation indicates that the trained classification algorithm categorized some significant portion of the documents differently than did the user who manually assigned statuses in stage 220, and the output of the classification algorithm needs improvement via further training.

At stage 245, the concepts used to tag the documents are revised, which may include modifying the definitions of existing concepts and/or adding new concepts to and/or removing concepts from the information extraction and tagging model. This will, in effect, provide different concepts (variables) to the classification algorithm when it is retrained by incorporating information not available in the previous run of the classification algorithms. In one embodiment, automated measures of classification performance and analysis of lack of correlation may be used to identify redundant or poorly constructed concepts.

At stage 250, process 200 performs concept tagging of the broad set of documents using the revised concepts. In one embodiment, this is performed in much the same manner as described with respect to stage 210.

Next, at stage 255, a subset of the broad set of documents, which now have revised concept tags from stage 250, is selected. In one embodiment, this sample may be selected at random. In other embodiments, this sample may be selected in some constrained fashion, such as by oversampling documents with a higher or a lower predicted likelihood of relevance or by sampling documents to account for the uncertainty with which the predicted likelihood of relevance is calculated.

After a new subset of documents is selected, process 200 proceeds to stage 220 and subsequent stages as previously described, forming an iterative loop that actively trains the classification algorithm until it screens documents in a manner that closely correlates with the manual screening performed by the user. The embodiment shown as process 200 allows a user to separate a large number of documents into three output sets without having to manually read or analyze each and every document. The output set of relevant documents may be fully read, analyzed, and applied to the user's purpose; the output set of irrelevant documents may be disregarded; the output group of indeterminate relevance may be further analyzed to determine their final use.

Process 200 is an example of one embodiment consistent with the invention, and it may have stages added, deleted, reordered, or modified without departing from principles of the invention. For example, the analysis and reclassification operations in stage 260 may be deleted in embodiments using binary "relevant" and "irrelevant" classifications for the documents, as such an embodiment will not have any documents classified as "indeterminate." For another example, stage 230 may be performed on the broad set of documents instead of the subset, and stage 260 may be modified so as not to apply the classification algorithm, because it will already have been done in stage 230.

Figure 3:
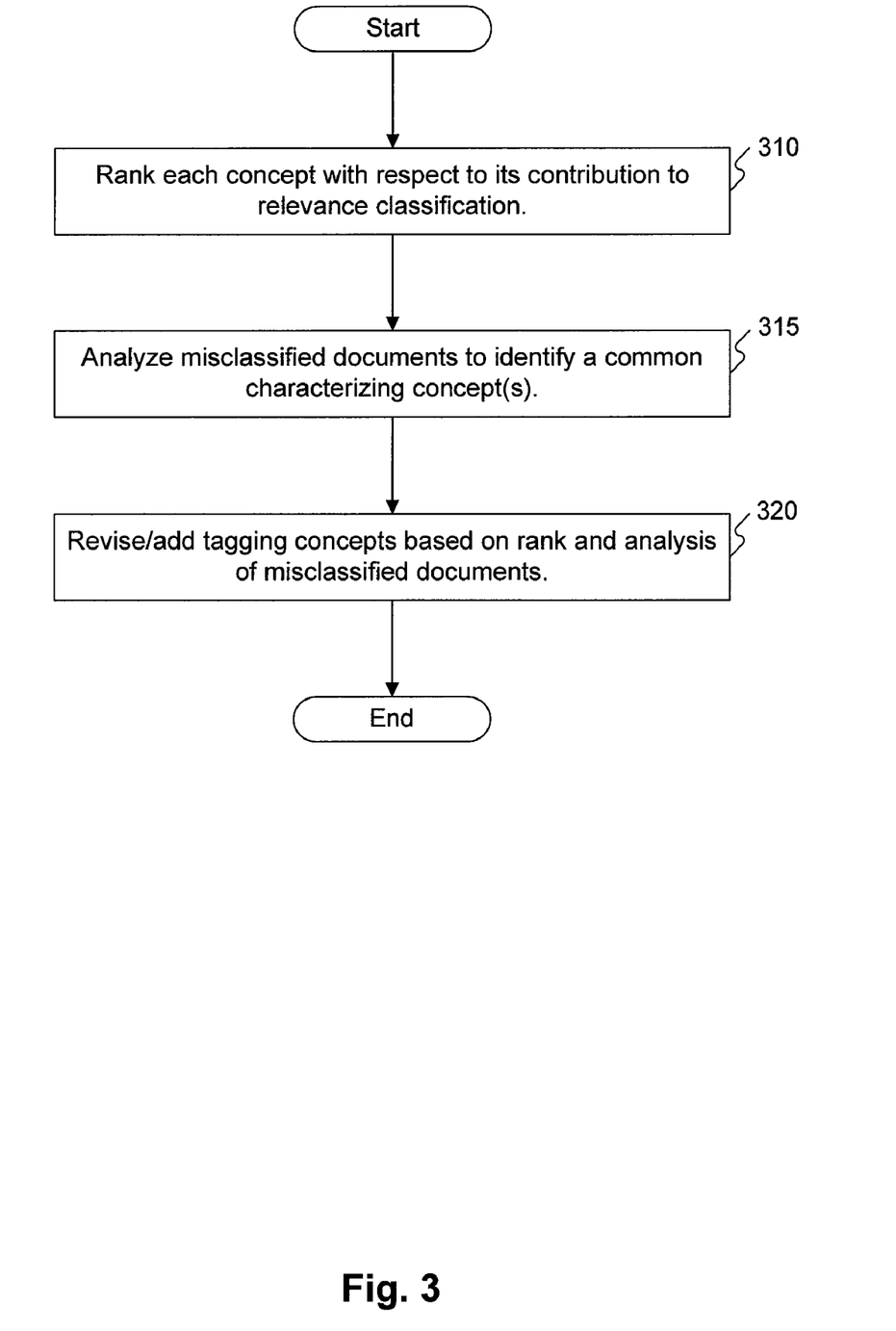
FIG. 3 is a flow diagram of an exemplary process for revising document tagging concepts, consistent with principles of the invention.

FIG. 3 is a flow diagram of an exemplary process for revising document tagging concepts, consistent with principles of the invention. In one embodiment, the exemplary process shown in FIG. 3 may be used to revise the concepts used to tag the broad set of document in stage 245 of FIG. 2. In one embodiment, some or all of the stages of the process shown in FIG. 3 may be implemented using a computer system programmed with appropriate software.

As shown in the embodiment of FIG. 3, the process begins by ranking each concept with respect to each concept's contribution to the relevance classification of documents (stage 310). In one embodiment, the classification algorithm used in stage 230 of FIG. 2 ranks the concepts used to tag the documents with regard to each concept's contribution to the discrimination. This ranking tells the user which of the concepts were most important in the classification model, and also which concepts played little or no role in the classification output.

The process also analyzes misclassified documents to identify a common characterizing concept or concepts (stage 315). For example, in one embodiment, if a user is manually classifying and assigning statuses to a selected subset of documents (for example, 50 documents, as described with respect to stage 220 of FIG. 2), and the user finds a number of documents (for example 12) that the previous classification algorithm run has misclassified (e.g., classified relevant documents as irrelevant or vice-versa), then the user may direct the system to perform an n-gram analysis of the misclassified docs. The user may analyze the n-gram analysis output to identify a new or revised concept that acts as a discriminant for the misclassified docs. In a more specific example, if a batch of four of the 12 documents were classified as "relevant" by the user, but were classified as "irrelevant" by the classification algorithm, and the remaining batch of eight documents were classified as "irrelevant" by the user, but were classified as "relevant" by the classification algorithm, then the system may find a textual term, or set of terms, that is in the relevant batch and missing in the irrelevant batch.

As shown in the embodiment of FIG. 3, the process then revises the tagging concepts based on the ranking and/or analysis of the misclassified documents (stage 320). For example, the user may remove concepts that played no role in the classification of documents according to the output of stage 310. For another example, the user may then use an identified term, or set of terms, output from stage 315 to form a new concept (or concepts) to add to the tagging model. In one embodiment, as explained with respect to FIG. 2, the classification algorithm will use any new and revised concepts to retrain and screen documents.

The process shown in FIG. 3 is an example of one embodiment consistent the invention, and it may have stages added, deleted, reordered, or modified without departing from principles of the invention. For example, stage 310 may be deleted so that only stages 315 and 320 are performed, or stage 315 may be deleted so that only stages 310 and 320 are performed.

Figure 4:
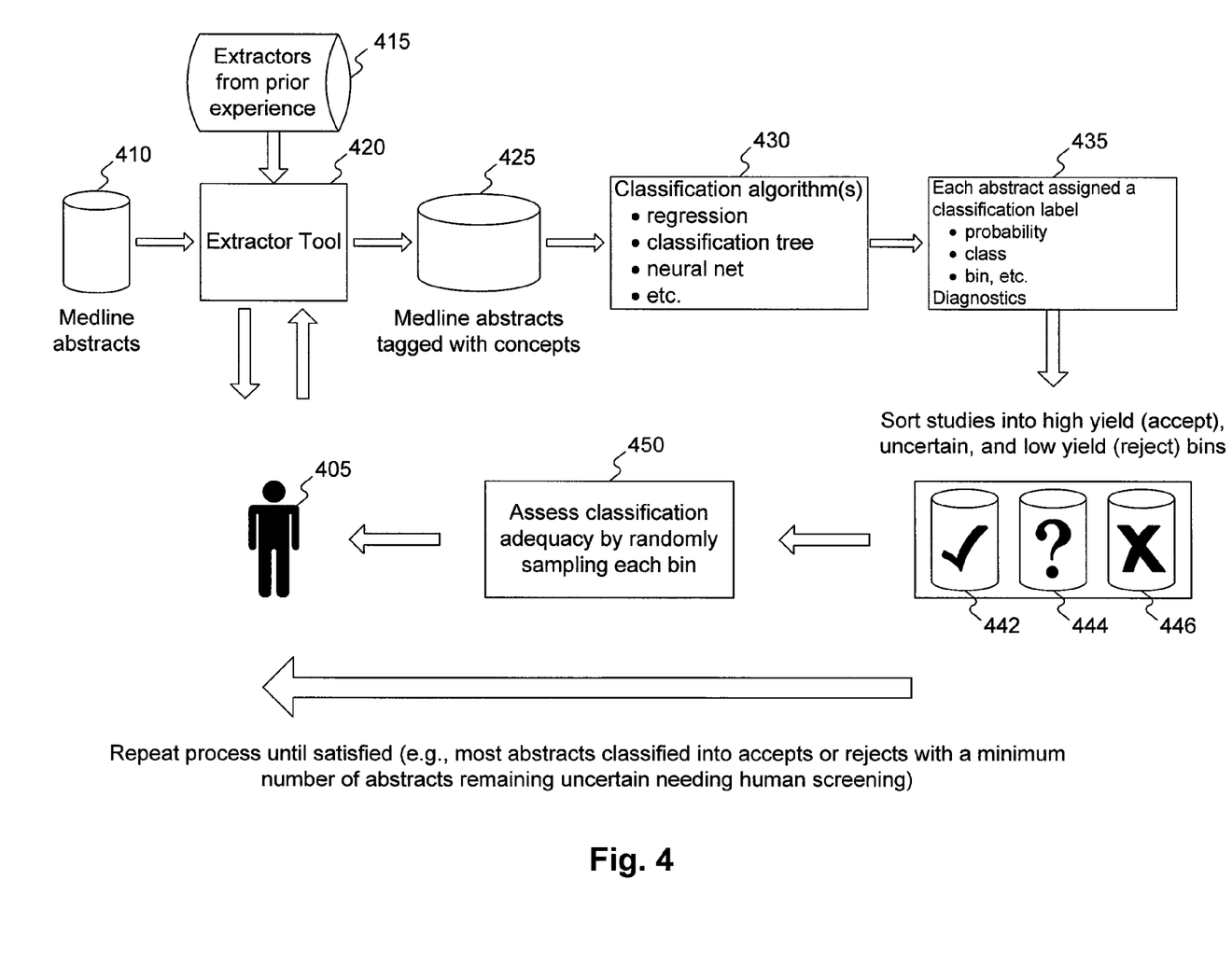
FIG. 4 is a diagram of an exemplary system for screening documents, consistent with principles of the invention.

FIG. 4 is a diagram of an exemplary system for screening documents, consistent with principles of the invention. This embodiment uses medical abstracts as an exemplary type of document. In one embodiment, some or all of the parts of the system shown in FIG. 4 may be implemented using a computing system, which may include multiple computers, programmed with appropriate software.

As shown in the embodiment of FIG. 4, a user 405 performs an initial literature search of a document database, such as a Medline™ abstract database (not shown), using, for example, a keyword search strategy related to the purpose for gathering, and ultimate usage of, the documents. The initial literature search may be instigated by the user 405 using the document database's user interface, as is known in the art. In the embodiment shown, this literature search produces a set of possibly relevant Medline™ abstracts 410. In other embodiments, more than one database and other types of information repositories may be searched by the user 405 to produce the set of possibly relevant abstracts 410. Types of searches other than keyword searches may also be used to create the set of possibly relevant abstracts 410.

Using as input the set of possibly relevant Medline™ abstracts 410, an extractor tool 420 may be used to apply concept tags to the abstracts and output a set of possibly relevant Medline™ abstracts that are tagged with concepts 425.

In one embodiment consistent with principles of the invention, extractor tool 420 may be a personal information extraction and modeling (PIEM) tool, as described in U.S. patent application Ser. No. 11/434,847, filed May 17, 2006, and/or U.S. patent application Ser. No. 11/976,818, filed Oct. 29, 2007, which are incorporated by reference into this application, or any other extractor tool capable of associating a tag or metadata with a document file or other computerized representation of a document. In this embodiment, each abstract in the group of possibly relevant Medline™ abstracts 425 may be associated with a concept tag(s), which are metadata describing a specific topic or subject matter of interest specified by user 405, if that subject matter is present in the text of the associated abstract. Concepts typically contain information key to distinguishing abstracts relevant to the problem under consideration from other abstracts, and the problem may include several key questions, where different documents contain information that contributes to answering different questions. For example, amongst the concepts that would be common across medical clinical trials documents, a "patients with" concept tag may be applied to or associated with the abstract documents that have one or more text fragments that match the extractor for the "patients with" concept. An extractor is a text pattern or other pattern used by extractor tool 420 to identify relevant documents. For example, the "patients with" concept may have an extractor represented by a pattern composed of two parts: (1) a trigger and (2) the remainder of the sentence after a trigger. The trigger may be a set of text strings in this case, such as "patients with", "women suffering from", and "children admitted to hospital for," and the remainder of the sentence after such a trigger typically contains information about patient conditions or characteristics. For another example, the "aims" concept for medical study documents may use an extractor including a trigger for sentences starting with the phrases "In order to assess" or "We sought to investigate." More detailed descriptions of exemplary embodiments of concepts and extractors may be found in U.S. application Ser. No. 11/434,847, filed May 17, 2006, and U.S. application Ser. No. 11/976,818, filed Oct. 29, 2007.

In one embodiment consistent with principles of the invention, the user 405 may use extractor tool 420 to construct a set of concepts that contain information key to distinguishing abstracts containing subject matter relevant to the problem under consideration. These concepts are then applied to each abstract in the set of possibly relevant Medline™ abstracts 410 and the extracted information is output to the set of possibly relevant Medline™ abstracts tagged with concepts 425, which may be held in a database in one embodiment.

As shown in the embodiment of FIG. 4, extractor tool 420 may also or alternatively use a set of extractors from prior experience 415 to apply concept tags and produce the tagged group of possibly relevant Medline™ abstracts 425. For example, based on the subject matter of the project, the user 405 may identify reusable concepts and extractors from a previous project that had similar subject matter, input the concepts and extractors 415 into the extractor tool 420 and direct the extractor tool 420 to apply the concepts and associated extractors to tag the group of possibly relevant Medline™ abstracts 425. For instance, in the case of clinical trials meta-analysis, extractors for study aims, interventions, patient characteristics, etc., would likely be reusable from one meta-analysis project to the next because the extractors are consistent across the clinical trial literature regardless of the details of any specific trial.

To initially train a classification algorithm, user 405 may obtain and then manually classify a set of randomly selected abstracts from the Medline™ abstracts tagged with concepts 425. To classify each abstract in the randomly selected set, user 405 may, for example, read each abstract and assign each abstract a status label of "relevant" or "irrelevant" as judged by user 405 with respect to the problem under consideration and the intended usage of the abstracts. The intended usage may be utilization in a EBM meta-analysis, utilization in a product design, utilization in a legal document or publishable article, etc. In one embodiment, while classifying each abstract, user 405 may enter specific information about the accuracy of the extractor(s) associated with a concept into the system, which will assist extractor tool 420 in creating better extractors. For example, if during manual classification, user 405 notices that an extractor missed an obvious variant of a phrase describing a concept, the analyst may modify the extractor to recognize the variant. Other means to classify the abstracts in the randomly selected set may also be used, other status labels may also be used, and more than two status labels may also be used, without departing from principles of the invention. In one embodiment, extractor tool 420 may choose the set of randomly selected abstracts for user 405 to classify. Other means to choose the abstracts in the randomly selected set may also be used, including means that produce a non-random selection of abstracts.

The system inputs the randomly selected set of tagged, status-labeled abstracts into one or more classification algorithm(s) 430. Classification algorithm 430 uses the status labels from the randomly selected set of classified abstracts together with their associated concept tags, to train and model the relationship between the known status labels (e.g., outcomes) and the concept(s) tagged to each abstract (e.g., variables). In one embodiment, classification algorithm 430 is a machine learning algorithm that uses statistical or other optimization criteria to minimize the distance between the status labels and the concept tag(s) for the randomly selected set of classified abstracts. In various embodiments, classification algorithm 430 may be a statistical regression, a classification tree, or a neural network algorithm. Other types of classification algorithms may also be used, for example, a projection pursuit algorithm.

In one embodiment, trained classification algorithm(s) 430 is applied to the randomly selected set of tagged, status-labeled abstracts. In another embodiment, trained classification algorithm(s) 430 may be applied to all the abstracts of the Medline™ abstracts tagged with concepts 425.

The system assigns a classification label to each abstract 435 fed as an input to classification algorithm(s) 430. The classification label is data representing a prediction as to whether, and/or to what degree, each abstract is relevant or important to the problem under consideration and/or the intended usage of the abstracts. In various embodiments, the classification label may represent a probability that an abstract is relevant, a category of likelihood of relevance of an abstract, and/or a sorting bin representing a qualitative description of a frequency of relevance applied to an abstract, among other things.

Figure 5:
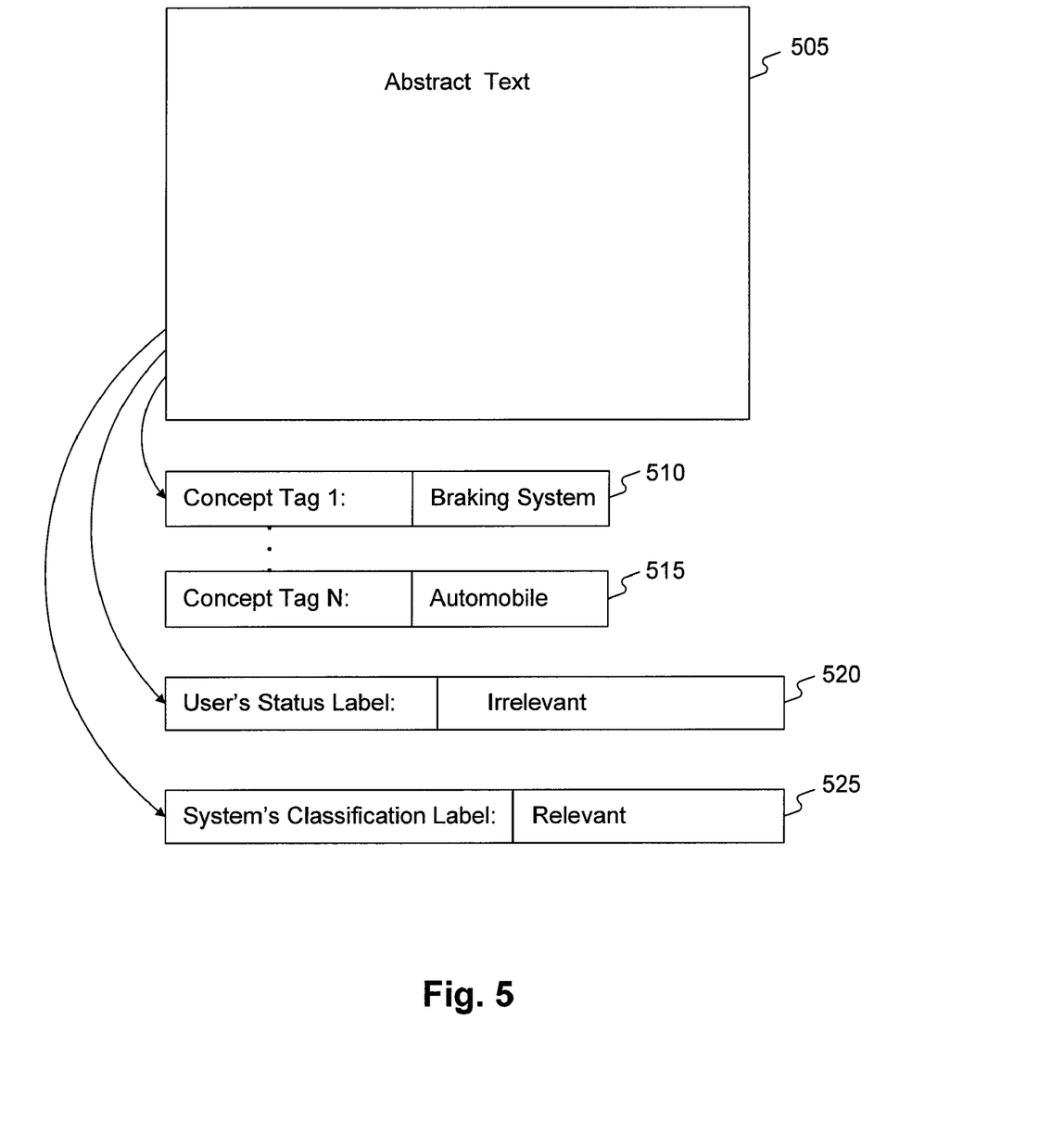
FIG. 5 is a diagram of an exemplary data structure consistent with principles of the invention.

To better illustrate the various data associated with each abstract, consider for a moment FIG. 5, which is a diagram of an exemplary data structure consistent with principles of the invention. In one embodiment, the exemplary data structure of FIG. 5 may be used to store the Medline™ abstracts in the database of Medline™ abstracts tagged with concepts 425. In the illustrated embodiment of FIG. 5, the data structure includes an abstract text field 505, which contains the text of an abstract, such as a Medline™ abstract or a U.S. or foreign patent abstract. In other embodiments field 505 may contain an entire document, such as a medical study or a patent, or some portion of a document.

In the embodiment shown, there are several fields, or pieces of data or information 510 through 525, associated with the abstract text field 505. The fields 510 through 525 describe or hold information about the data or information in the abstract text field 505. For example, associated with the abstract text field 505 are one to N concept tag fields 510 through 515. Abstract text field 505 may be associated with a concept tag field via data structure links, links between database tables, inclusion in one static data structure; pointers to other data structures, or other means known in the art, as the exact means of association are not important to the invention. In one embodiment, concept tags, such as "braking system" in the concept tag field 510, may be created and associated with the abstract text field 505 by the extractor tool 420.

Also associated with abstract text field 505 is a user's status label field 520. User's status label field 520 contains a label applied by a user to describe the abstract found in the associated abstract text field 505 (for example, user 405 as described in FIG. 4 and as described with relation to stage 220 of FIG. 2). In the example of FIG. 5, the user's status label field 520 is shown as containing the value "Irrelevant," indicating that the user who applied the label considers the abstract found in the associated abstract text field 505 to not be of value in solving the problem under consideration and/or not important to the intended usage of the abstracts being screened. In some embodiments, there may be no value in the user's status label field 520 (or no user's status label field 520 at all) for many of the abstracts in the total set of abstracts, because a user may evaluate and label only small subsets of the total set of abstracts being screened. For example, only 150 out of 5000 abstracts being screened for an EBM meta-analysis may have user's status label data supplied in user's status field 520.

In the embodiment shown in FIG. 5, also associated with abstract text field 505 is a system's classification label field 525. The system's classification field 525 contains a label applied by the system to describe the abstract in the associated abstract text field 505. In some embodiments, the value in the system's classification field 525 may be assigned by the system at 435 in FIG. 4 and as described with relation to stage 230 of FIG. 2. In the embodiment of FIG. 5, the system's classification label field 525 is shown as containing the value "Relevant," indicating that the trained classification algorithm that applied the label considers the abstract found in the associated abstract text field 505 relevant to the intended usage of the abstract according to its model after consideration of the associated concept tags 510 to 515.

Returning again to the embodiment shown in FIG. 4, after the system assigns a classification label to each input abstract 435, the system sorts each abstract into one of three classification bins: an accept bin 442, a reject bin 446, or an uncertain bin 444. In one embodiment, the classification bin information may be stored in the system's classification label field 525 of FIG. 5. More or fewer classification categories may be used in various embodiments. In the illustrated embodiment of FIG. 4, the abstracts are part of larger medical papers or studies, and the system moves the electronic file(s) for the entire paper or study corresponding to each abstract into a storage area corresponding to the abstract's assigned classification label, such as an appropriately labeled file system folder. Thus, in the pictured embodiment, the user 405 may access a storage area corresponding to the accept bin 442 to find all the studies predicted to be relevant by the classification algorithm(s) 430, as the system has screened out all the irrelevant studies and placed them into a storage area corresponding to the reject bin 446. In the embodiment shown, the system places studies that it cannot definitively categorize into a storage area corresponding to the uncertain bin 444, where the user 405 may access them for manual evaluation, if desired.

As shown in the embodiment of FIG. 4, in order to assess the performance of the system in screening abstracts, and decide whether to continue to train the classification algorithm(s) 430, the user 405 may assess the classification adequacy 450 of the system by sampling each bin 442-446, (for example, randomly), analyzing the abstracts (or entire studies) in the sampled set and comparing the user-assigned status labels (such as the data in the user's status label field 520) to the system-assigned bin label (such as the data in the system's classification label field 525).

In one embodiment, the system may provide results in a form that supports classification diagnostics, which can be applied to those abstracts for which the correct classifications are already known (e.g., those which the user 405 has manually classified) to compare the user's classification and the system's classification (e.g., compare the data in the user's status label field 520 to the data in the system's classification label field 525). Classification diagnostics may describe different aspects of the closeness of the system's predicted labels (e.g., 525) to a user's actual status labels (e.g., 520). The diagnostic metrics may include area under ROC curve, calibration, coefficient values, mean squared error and other distance metrics. Measures of classification performance and analysis of lack of fit can help to suggest ways to improve classification by identifying redundant or poorly constructed concepts.

Using the information from classification diagnostics, the user 405 may refine and improve the concept model for the abstracts by modifying the definitions of existing concepts and/or by adding or removing concepts. Extractor tool 420 may then retag the abstracts in the database of Medline™ abstracts 425 using the refined set of concepts. In one embodiment, the extractor tool 420 may store records of all the concepts that were defined, together with their extractors, as the learning and screening process progresses, and these records may serve as documentation of the screening decision process.

In one embodiment, to judge the adequacy of a refined set of concepts (e.g., the output of stage 245 of FIG. 2), the system may select a new set of retagged abstracts from the database of Medline™ abstracts tagged with concepts 425 for the user 405 to manually classify and apply status labels. Selection may be random, or selection may use the system's classification labels from the previous classification run to aid in choosing a more informative batch of abstracts.

As previously described, the newly selected set of retagged and manually classified abstracts may then be used to train the classification algorithm(s) 430, which is then applied to the newly selected set of retagged abstracts (or in another embodiment, applied to the entire set of Medline™ abstracts retagged with concepts 425) to produce a system's classification label (such as the data in system's classification label field 525) applied to each abstract in the set. This process may be repeated iteratively, building a classification model that learns from the input of the user 405, until the user 405 is satisfied with the system's labeling accuracy.

In one embodiment, indicators that the model has been optimized to attain high labeling accuracy include: reaching a pre-specified number of iterations through the process, attaining a specific level of performance (e.g., 80% of the abstracts in the accept bin 442 and the reject bin 446 are labeled accurately or 90% of the abstracts in the accept bin are labeled accurately), achieving an equilibrium point in model performance such that performance metrics (e.g., an ROC curve as well as the optimal specificity that allows perfect sensitivity) are no longer changing, and having a predetermined threshold of abstracts (e.g., 65%, 80%, 90%, etc.) classified by the classification algorithms into either the accept category 442 or the reject category 446.

In an embodiment where the system is trained and evaluated using only selected subsets of abstracts for each iteration, after the user 405 is satisfied with the system's labeling accuracy, the classification algorithm(s) 430 may be applied to all the remaining unlabeled abstracts in the set of Medline™ abstracts 425, such that the system produces a classification label for all the abstracts under consideration. Thus, this embodiment allows the user 405 to easily separate a large set of abstracts 425 into three bins 442, 444, and 446, while manually classifying only a small subset.

The system shown in FIG. 4 is an example of one embodiment consistent the invention, and it may have parts added, deleted, reordered, or modified without departing from principles of the invention. For example, parts 430 and 435 may be combined, or bin 444 could be deleted.

Figure 6:
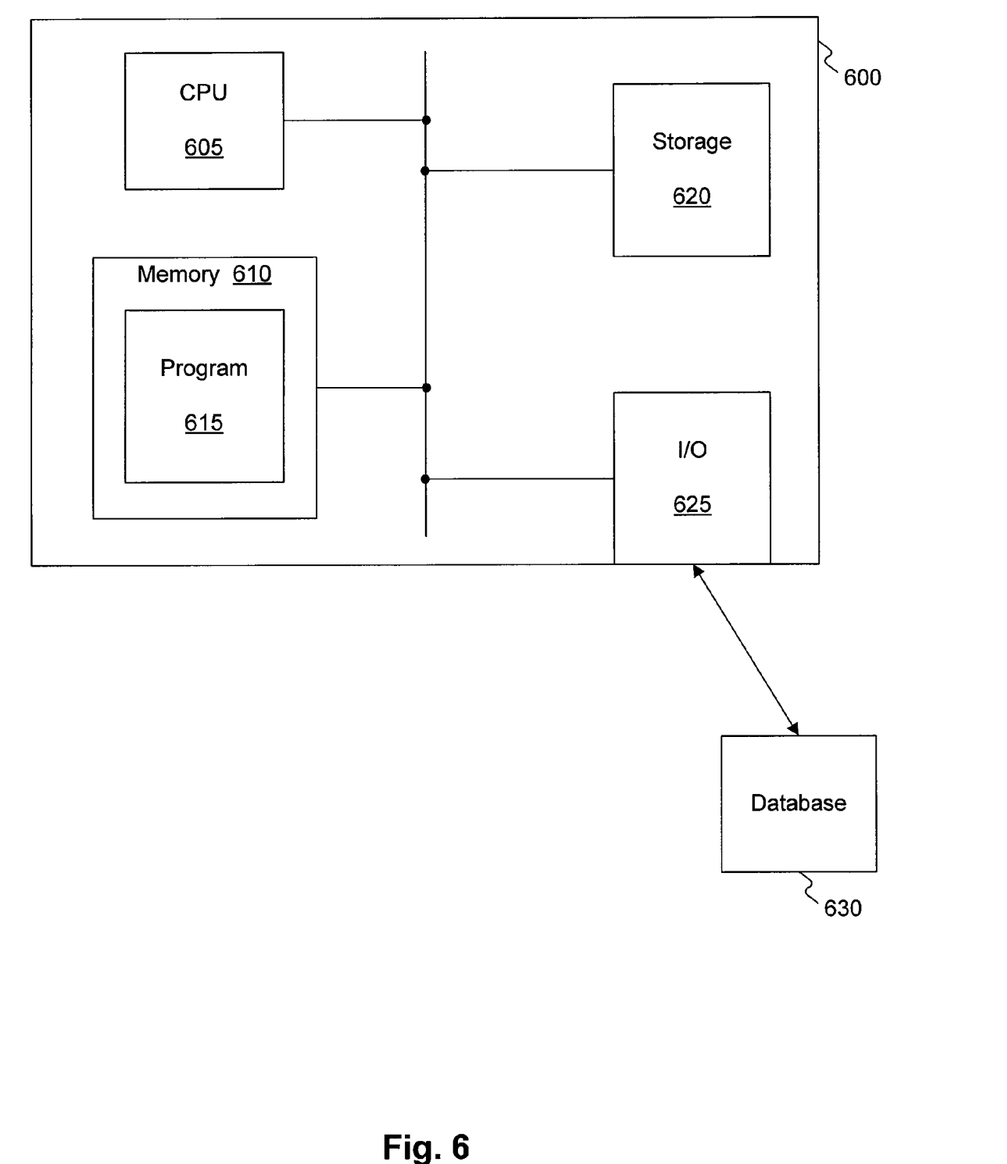
FIG. 6 is a block diagram of an exemplary data processing system that may be used to implement embodiments consistent with principles of the invention.

FIG. 6 illustrates an exemplary computing system 600 that may be used to implement embodiments of the invention. The components and arrangement, however, may be varied within principles of the present invention.

Data processing or computing system 600 includes a number of components, such as a central processing unit (CPU) 605, a memory 610, an input/output (I/O) device(s) 625, a nonvolatile storage device 620, and a database 630. System 600 can be implemented in various ways. For example, an integrated platform (such as a workstation, personal computer, laptop, etc.) may comprise CPU 605, memory 610, nonvolatile storage 620, and I/O devices 625. In such a configuration, components 605, 610, 620, and 625 may connect through a local bus interface and access database 630 (shown implemented as a separate database system) via an external connection. This connection may be implemented through a direct communication link, a local area network (LAN), a wide area network (WAN) and/or other suitable connections. System 600 may be standalone or it may be part of a subsystem, which may, in turn, be part of a larger system, such as document screening system.

CPU 605 may be one or more known processing devices, such as a microprocessor from the Pentium™ family manufactured by Intel™ or the Turion™ family manufactured by AMD™. Memory 610 may be one or more storage devices configured to store information used by CPU 605 to perform certain functions related to embodiments of the present invention. Storage 620 may be a volatile or non-volatile, magnetic, semiconductor, tape, optical, removable, nonremovable, or other type of storage device or computer-readable medium. In one embodiment consistent with the invention, memory 610 includes one or more programs or subprograms 615 loaded from storage 620 or elsewhere that, when executed by CPU 605, perform various procedures, operations, or processes consistent with the present invention. For example, memory 610 may include a extractor tool program that creates concepts and extractors and tags documents with concepts and other metadata, a classification algorithm program that creates a classification label prediction model based on concept tags for a set of documents and a set of supplied desired classification labels and labels documents according to the model, and an integrative support program that links the other two programs and allows them to use a common database, provides a common user interface, performs basic bookkeeping tasks, (such as storing each successive concept model to support roll-back, storing the user's input, etc.), manage the document screening process, and provide user guidance and help. Memory 610 may also include other programs that perform other functions and processes, such as programs that provide communication support, Internet access, etc.

Methods, systems, and articles of manufacture consistent with the present invention are not limited to separate programs or computers configured to perform dedicated tasks. For example, memory 610 may be configured with a program 615 that performs several functions when executed by CPU 605. For example, memory 610 may include a single program 615 that performs the functions of an extractor tool and a classification algorithm(s). Moreover, CPU 605 may execute one or more programs located remotely from system 600. For example, system 600 may access one or more remote programs that, when executed, perform functions related to embodiments of the present invention.

Memory 610 may be also be configured with an operating system (not shown) that performs several functions well known in the art when executed by CPU 605. By way of example, the operating system may be Microsoft Windows™, Unix™, Linux™, an Apple Computers operating system, Personal Digital Assistant operating system such as Microsoft CE™, or other operating system. The choice of operating system, and even to the use of an operating system, is not critical to the invention.

I/O device(s) 625 may comprise one or more input/output devices that allow data to be received and/or transmitted by system 600. For example, I/O device 625 may include one or more input devices, such as a keyboard, touch screen, mouse, and the like, that enable data to be input from a user, such as concept information, status labels, database identifiers, etc. Further, I/O device 625 may include one or more output devices, such as a display screen, CRT monitor, LCD monitor, plasma display, printer, speaker devices, and the like, that enable data to be output or presented to a user. I/O device 625 may also include one or more digital and/or analog communication input/output devices that allow computing system 600 to communicate with other machines and devices. System 600 may input data from external machines and devices and output data to external machines and devices via I/O device 625. The configuration and number of input and/or output devices incorporated in I/O device 625 are not critical to the invention.

System 600 may also be communicatively connected to a database 630. Database 630 may comprise one or more databases that store information and are accessed and/or managed through system 600. By way of example, database 630 may be an Oracle™ database, a Sybase™ database, or other relational database. Database 630 may include, for example, data and information related to documents, concepts, extractors, status labels, classification labels, etc. Systems and methods of the present invention, however, are not limited to separate databases or even to the use of a database.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-assisted method for screening information in a set of documents, comprising:
    a) creating a set of concepts representing subject matter in the documents;
    b) creating a plurality of status labels representing relevancy of the documents to an end use for the set of documents;
    c) selecting a first subset of the set of documents;
    d) identifying occurrences of concepts from the set of concepts in each document in the first subset based on subject matter in each document;
    e) assigning a status label from the plurality of status labels to each document in the first subset based on relevancy of the document to the end use for the document;
    f) processing, using a computer, the first subset of the set of documents to learn relationships among the set of concepts and the labels and create a classification model of the relationships;
    g) modifying the set of concepts based on the learned relationships among the set of concepts and the status labels;
    h) selecting a second subset of the set of documents;
    i) assigning a status label from the plurality of status labels to each document in the second subset based on relevancy of the document to the end use for the document;
    j) processing, using the computer, the second subset to further learn relationships among the set of concepts and the labels and refine the classification model of the relationships; and
    k) if the classification model of the relationships is satisfactory, then screening, using the computer, the set of documents based on the classification model of the relationships, such that a subset of relevant documents is identified.

2. The computer-assisted method of claim 1, further comprising:
    repeating d) through j) until the classification model is satisfactory.

3. The computer-assisted method of claim 1, wherein f) processing the first subset of the set of documents to learn relationships among the set of concepts and the labels further comprises:
    assigning a classification label to each document in the first subset; and
    wherein j) processing the second subset to further learn relationships among the set of concepts and the status labels further comprises:
        assigning a classification label to each document in the second subset.

4. The computer-assisted method of claim 3, further comprising:
    analyzing, using the computer, a correlation between the classification labels for the documents in the second subset and the status labels for the documents in the second subset; and
    determining that the classification model is satisfactory if there is a high correlation.

5. The computer-assisted method of claim 1, wherein c) selecting a first subset further comprises:
    selecting a first random subset of documents from the set of documents; and
    wherein h) selecting a second subset further comprises:
    selecting a second random subset of documents from the set of documents.

6. The computer-assisted method of claim 1, wherein h) selecting a second subset further comprises:
    selecting a second subset of documents by oversampling documents predicted to have a high or low likelihood of relevance by the classification model of the relationships.

7. The computer-assisted method of claim 1, wherein g) modifying the set of concepts further comprises:
    analyzing documents that were misclassified by the classification model to identify a concept common to each misclassified document.

8. The computer-assisted method of claim 1, further comprising:
    utilizing the subset of relevant documents for the end use.

9. The computer-assisted method of claim 1, wherein the end use is a systematic review of literature.

10. The computer-assisted method of claim 1,
    wherein the plurality of status labels comprises a first status label indicating a document is relevant and a second status label indicating a document is irrelevant; and
    wherein the computer-assisted method further comprises:
        analyzing, using the computer, a first percentage of documents corresponding to the first status label and a second percentage of documents corresponding to the second status label, according to the classification model; and
        determining that the classification model is satisfactory if a sum of the first percentage and the second percentage exceeds a predetermined threshold.

11. A computer-assisted method for identifying relevant documents among a set of documents, comprising:
    a) tagging each document in the set of documents with a concept from a set of concepts representing subject matter found in each document;
    b) selecting a subset of documents from the set of documents;
    c) assigning a status label to each document in the subset, the status label representing a degree of importance of the document;
    d) training a classification algorithm using the subset of documents, where the classification algorithm relates the status labels assigned to the documents to the concepts tagged to the documents, using a computer;
    e) applying the classification algorithm to the subset of documents to create a classification label for each document in the subset, using the computer, the classification label representing a predicted degree of importance of the document;
    f) comparing the classification labels to the status labels, using the computer;
    g) if the classification labels substantially correspond to the status labels, then applying the classification algorithm to the set of documents to create a classification label for each document, using the computer;

h) if the classification labels do not substantially correspond to the status labels, then modifying the set of concepts representing subject matter found in the documents and repeating a) through h) using the modified set of concepts, and i) utilizing the documents having a classification label representing a high predicted degree of importance for an end use.

12. The computer-assisted method of claim 11, wherein the end use is a systematic review of literature.

13. The computer-assisted method of claim 11, wherein the classification labels substantially correspond to the status labels if a predetermined number of iterations of b) through h) have been performed.

14. The computer-assisted method of claim 11, wherein the classification labels substantially correspond to the status labels if a specified number of classification labels are the same as the status labels for the subset of documents.

15. The computer-assisted method of claim 11, further comprising:

applying a diagnostic algorithm to the output of the classification algorithm to create a ranking of the set of concepts representing a contribution of each concept to the classification label; and wherein modifying the set of concepts representing subject matter found in the documents further comprises:
modifying the set of concepts based on the ranking.

16. The computer-assisted method of claim 11, further comprising:

applying a diagnostic algorithm to the output of the classification algorithm to identify a characterizing concept common to misclassified documents; and wherein modifying the set of concepts representing subject matter found in the documents further comprises:
modifying the set of concepts based on the characterizing concept.

17. The computer-assisted method of claim 11, wherein b) selecting a subset further comprises:

selecting a random subset of documents from the set of documents.

18. The computer-assisted method of claim 11, wherein b) selecting a subset further comprises:

initially selecting a random subset of documents from the set of documents; and subsequently selecting a subset of documents by oversampling documents predicted to have a high or low likelihood of relevance according to the classification model of the relationships.

19. A system for identifying relevant documents among a set of documents, comprising:

a memory device containing document data for each document in the set of documents, concept data associated with the document data, status label data associated with the document data and classification label data associated with the document data; and a processor, communicatively connected to the memory device, that executes code for performing operations comprising:

a) for the document data for each document in the set of documents, storing in the memory device concept data corresponding to a set of concepts representing subject matter found in the document;

b) selecting a subset of documents from the set of documents;

c) for the document data for each document in the subset, storing in the memory device status label data for each document in the subset, the status label data representing a degree of importance of the document;

d) executing a classification algorithm that is trained using the subset of documents, where the classification algorithm relates the status label data associated with the document data for each document in the subset to the associated concept data;

e) for the document data for each document in the subset, storing in the memory device classification label data for each document in the subset, the classification label data representing a predicted degree of importance of the document;

f) for the document data for each document in the subset, comparing the classification label data to the status label data;

g) if the classification label data substantially corresponds to the status label data, then executing the classification algorithm using the set of documents as input to create classification label data associated with the document data for each document in the set of documents;

h) if the classification label data does not substantially correspond to the status label data, then modifying the set of concepts representing subject matter found in the documents and repeating b) through h) using the modified set of concepts; and i) utilizing the documents having a classification label representing a high predicted degree of importance for an end use.

* * * * *